US011023045B2

United States Patent
Liu et al.

(10) Patent No.: US 11,023,045 B2
(45) Date of Patent: Jun. 1, 2021

(54) SYSTEM FOR RECOGNIZING USER GESTURES ACCORDING TO MECHANOMYOGRAM DETECTED FROM USER'S WRIST AND METHOD THEREOF

(71) Applicant: Coolso Technology Inc., Taipei (TW)

(72) Inventors: Meng Kun Liu, Taipei (TW); Zhao Wei Qiu, Kaohsiung (TW); Yu Ting Lin, Dongshi Township (TW); Chao Kuang Kuo, Kaohsiung (TW); Chi Kang Wu, Taipei (TW)

(73) Assignee: COOLSO TECHNOLOGY INC.

( * ) Notice: Subject to any disclaimer, the term of this patent is extended or adjusted under 35 U.S.C. 154(b) by 0 days.

(21) Appl. No.: 16/822,344

(22) Filed: Mar. 18, 2020

(65) Prior Publication Data

US 2020/0301509 A1   Sep. 24, 2020

(30) Foreign Application Priority Data

Mar. 19, 2019   (TW) ................... 108109262

(51) Int. Cl.
G09G 5/00       (2006.01)
G06F 3/01       (2006.01)
G06F 1/16       (2006.01)

(52) U.S. Cl.
CPC .............. *G06F 3/015* (2013.01); *G06F 1/163* (2013.01); *G06F 3/014* (2013.01); *G06F 3/017* (2013.01)

(58) Field of Classification Search
CPC .......... G06F 3/014; G06F 3/015; G06F 3/017; G06F 1/163
See application file for complete search history.

(56) References Cited

U.S. PATENT DOCUMENTS

| | | |
|---|---|---|
| 8,170,656 B2 | 5/2012 | Tan et al. |
| 8,421,634 B2 | 4/2013 | Tan et al. |
| 8,447,704 B2 | 5/2013 | Tan et al. |
| D717,685 S | 11/2014 | Bailey et al. |
| 9,971,313 B2 | 5/2018 | Chung |
| 10,120,455 B2 | 11/2018 | Wu |
| 10,603,690 B2 | 3/2020 | Zadesky et al. |

(Continued)

FOREIGN PATENT DOCUMENTS

| | | |
|---|---|---|
| AU | 2004100481 A4 | 7/2004 |
| CN | 104345886 A | 2/2015 |

(Continued)

*Primary Examiner* — Adam J Snyder
(74) *Attorney, Agent, or Firm* — Kwan & Olynick LLP

(57) ABSTRACT

A system for recognizing user gestures according to a muscle active signal detected from the user's wrist and a method thereof are provided. After detecting a target muscle active signal from a wrist of a user, the system obtains a target feature signal when the measured amplitude exceeds a predetermined value of the target muscle active signal, generates target feature data in accordance with the target feature signal, and uses a gesture classification model to classify the target feature data for recognizing the user's gestures. The proposed system and the method can let users easily wear this muscle active signal detecting device at the correct position for recognizing gestures accurately, and can achieve the effect of recognizing gestures with lower power consumption and lower costs.

10 Claims, 5 Drawing Sheets

(56) References Cited

U.S. PATENT DOCUMENTS

| | | |
|---|---|---|
| 2009/0327171 A1* | 12/2009 | Tan ................ G06F 3/015 706/12 |
| 2012/0004578 A1 | 1/2012 | Wu et al. |
| 2014/0028546 A1 | 1/2014 | Jeon et al. |
| 2014/0198034 A1 | 7/2014 | Bailey et al. |
| 2014/0198035 A1 | 7/2014 | Bailey et al. |
| 2014/0240103 A1 | 8/2014 | Lake et al. |
| 2014/0240223 A1 | 8/2014 | Lake et al. |
| 2014/0249397 A1 | 9/2014 | Lake et al. |
| 2014/0334083 A1 | 11/2014 | Bailey |
| 2015/0141784 A1 | 5/2015 | Morun et al. |
| 2015/0148641 A1 | 5/2015 | Morun et al. |
| 2015/0169074 A1 | 6/2015 | Ataee et al. |
| 2015/0215443 A1* | 7/2015 | Heo ................ G06F 3/015 455/556.1 |
| 2015/0261306 A1 | 9/2015 | Lake |
| 2015/0301606 A1* | 10/2015 | Andrei ............ G06F 3/017 345/156 |
| 2015/0342513 A1 | 12/2015 | Wu et al. |
| 2015/0370326 A1 | 12/2015 | Chapeskie et al. |
| 2016/0062320 A1 | 3/2016 | Chung |
| 2016/0150987 A1* | 6/2016 | Kwon ............ A61B 5/04012 600/476 |
| 2016/0156762 A1 | 6/2016 | Bailey et al. |
| 2016/0195928 A1 | 7/2016 | Wagner et al. |
| 2016/0238845 A1 | 8/2016 | Alexander et al. |
| 2016/0313801 A1 | 10/2016 | Wagner et al. |
| 2017/0172491 A1 | 6/2017 | Wu et al. |
| 2018/0181206 A1 | 6/2018 | Wu |

FOREIGN PATENT DOCUMENTS

| | | |
|---|---|---|
| CN | 103581428 A | 3/2016 |
| CN | 103581428 B | 3/2016 |
| CN | 105388996 A | 3/2016 |
| CN | 205104519 U | 3/2016 |
| CN | 108255093 A | 7/2018 |
| EP | 1637076 B1 | 3/2015 |
| JP | 2008192004 A | 8/2008 |
| JP | 2009095431 A | 5/2009 |
| TW | 201201881 A | 1/2012 |
| TW | 201606573 A | 2/2016 |
| TW | 201722350 A | 7/2017 |
| TW | 201823672 A | 7/2018 |
| WO | 2002074167 A1 | 9/2002 |
| WO | 2004049934 A1 | 6/2004 |

\* cited by examiner

SYSTEM FOR RECOGNIZING USER GESTURES ACCORDING TO MECHANOMYOGRAM DETECTED FROM USER'S WRIST AND METHOD THEREOF

CROSS REFERENCE TO RELATED APPLICATIONS

The present application claims the benefit of priority from the Taiwan Patent Application No. 108109262, filed on 19 Mar. 2019, the disclosure of which is hereby incorporated by reference in its entirety.

BACKGROUND

1. Technical Field

A gesture determining system and method is provided, and in particular, a system and method for recognizing user gestures according to a muscle active signal (mechanomyogram signal) detected from a wrist is provided.

2. Description of the Related Art

At present, the technologies for gesture recognition are mostly related to prosthetic control and human-machine interface. According to some technologies, non-contact artificial vision is used for gesture recognition. However, in most of the technologies, it is required to avoid the line of sight of a camera to be blocked, which results in limited freedom. In addition, according to some technologies, a contact-type wearable apparatus is used to capture data for analysis and recognition. Contact-type manners are divided into many types, such as using an electromyogram (EMG) signal or a mechanomyogram (MMG) signal, ultrasonic imaging, pressure detection of a force sensitive resistor, or a tracker (VR specialized gloves) using a magnetic field for detection on the market, or the like, which have their own advantages and disadvantages, respectively.

Gesture movement analysis by using the electromyogram signal is one of many applications of the current wearable apparatus. An advantage thereof is that a small physiological reaction can be detected, but a disadvantage thereof is that a measured part is easily disturbed by an external factor. For example, if skin of an arm is sweating or the environment is too dry at the time, stability and a value of the measurement of the electromyogram signal will be affected. In addition, there is also a disadvantage of high device costs.

There are many types of sensors for detecting the muscle active signal, and different sensors will have different signal effects. In addition, a detected muscle position will also have different signal effects. The muscle position must be accurately found to achieve a sufficient accuracy rate; otherwise, the user's gesture cannot be effectively recognized. At present, according to most of the technologies for gesture recognition of muscle active signals, the muscle active signals of the wrist flexors and extensor muscles on a back of a forearm are captured. However, the wrist flexors and extensor muscles on the arm are difficult to be located and sensors are not easily fixed thereto, which causes inconvenience of wearing.

Based on the above, it may be learned that in the prior art, there have been problems of low accuracy of using the electromyogram signal to determine gestures and difficulty in wearing the sensor at the correct position through the muscle active signal. Therefore, it is necessary to propose improved technical measures to resolve the problems.

SUMMARY

In view of the problems of low accuracy of using the electromyogram signal to determine gestures and the difficulty in wearing a sensor for detecting the muscle active signal at the correct position, the present disclosure discloses a system and method for recognizing user gestures according to a muscle active signal detected from a wrist.

The system disclosed by the present disclosure for recognizing user gestures according to the muscle active signal detected from the wrist includes at least: a signal detecting module configure to detect a target muscle active signal from a wrist of a user; a signal capturing module configured to capture a target feature signal including an amplitude that exceeds a predetermined value from the target muscle active signal; a feature generating module configured to generate target feature data in accordance with the target feature signal; and a gesture recognizing module configured to classify target feature data to recognize a user gesture.

The method disclosed by the present disclosure for recognizing user gestures according to the muscle active signal detected from the wrist includes at least the following steps: creating a gesture classification model; detecting a target muscle active signal from a wrist of a user; capturing a target feature signal including an amplitude that exceeds a predetermined value from the target muscle active signal; generating target feature data in accordance with the target feature signal; and classifying the target feature data by using the gesture classification model, to recognize a user gesture.

According to the foregoing system and method disclosed in the present disclosure, a difference from the prior art is that in the present disclosure, after the target muscle active signal is detected from the wrist of the user through the wearable apparatus, the target feature signal including the amplitude that exceeds the predetermined value is captured from the target muscle active signal, the target feature data is generated in accordance with the captured target feature signal, and the target feature data is classified by using the gesture classification model, to recognize the user gesture, thereby resolving the problems existing in the prior art and recognizing the user gesture with lower power consumption to reduce product costs.

PREFERRED EMBODIMENT OF THE PRESENT DISCLOSURE

The features and implementations of the present disclosure will be described in detail below with reference to the drawings and embodiments. The content is sufficient for a person skilled in the art to easily and fully understand and implement the technical means used to resolve the technical problems of the present disclosure, thereby achieving the effects that can be achieved by the present disclosure.

According to the present disclosure, a gesture made by a user is determined in accordance with a muscle vibration (mechanomyogram) signal of a wrist of the user that makes the gesture, so that various recognizable gestures may be recognized with more than 90% recognition rate at a very low sampling frequency, which has lower power consumption and may also reduce costs. The muscle vibration signal is a mechanical signal that may be detected on a muscle surface during muscle contraction, which is also referred to as a muscle active signal in the present disclosure.

Figure 1:
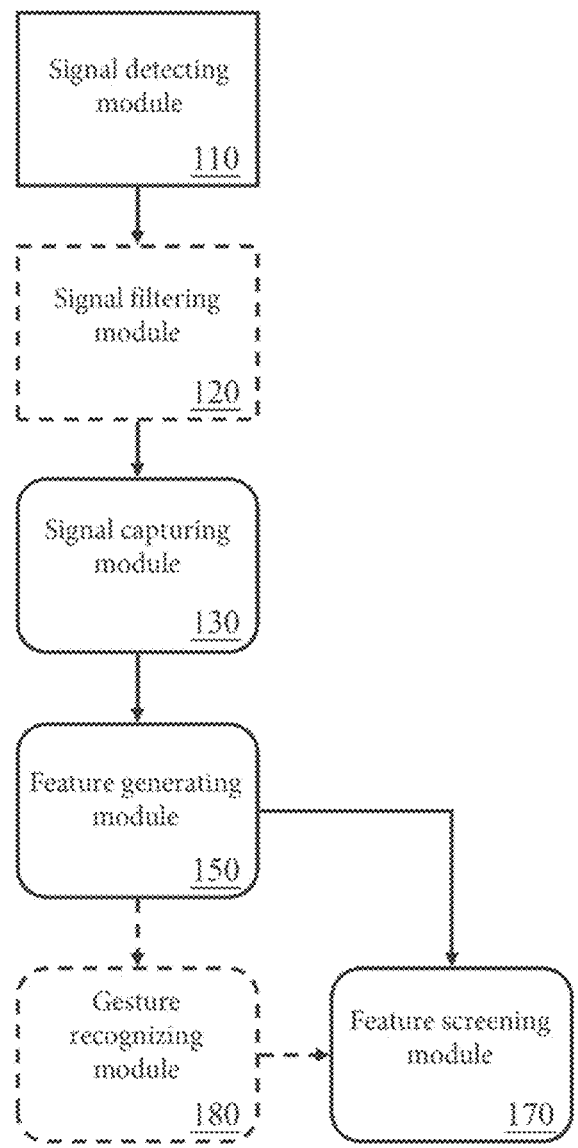
FIG. 1 is an architecture diagram of a system for recognizing user gestures according to a muscle active signal detected from a wrist according to the present disclosure.

The architecture diagram of a system for recognizing user gestures according to a muscle active signal detected from a wrist according to the present disclosure in FIG. 1 is first used to describe system operation of the present disclosure below. As shown in FIG. 1, the system of the present disclosure includes a signal detecting module 110, a signal capturing module 130, a feature generating module 150, a gesture recognizing module 170, and a signal filtering module 120 and a feature screening module 180 that may be added.

Each of the foregoing modules may be included in a same wearable apparatus (not shown in the figure). For example, all the modules can be disposed in a chip, and the chip is disposed on the wearable apparatus. Each of the foregoing modules may be alternatively distributed in two or more different apparatuses, for example, some modules are disposed in the chip of the wearable apparatus, and after calculation by the chip, the calculated data is transmitted to other modules disposed in a computer through wireless communication, but the present disclosure is not limited thereto. Different from the signal detecting module 110, other modules do not need to be disposed in the wearable apparatus.

Figure 2:
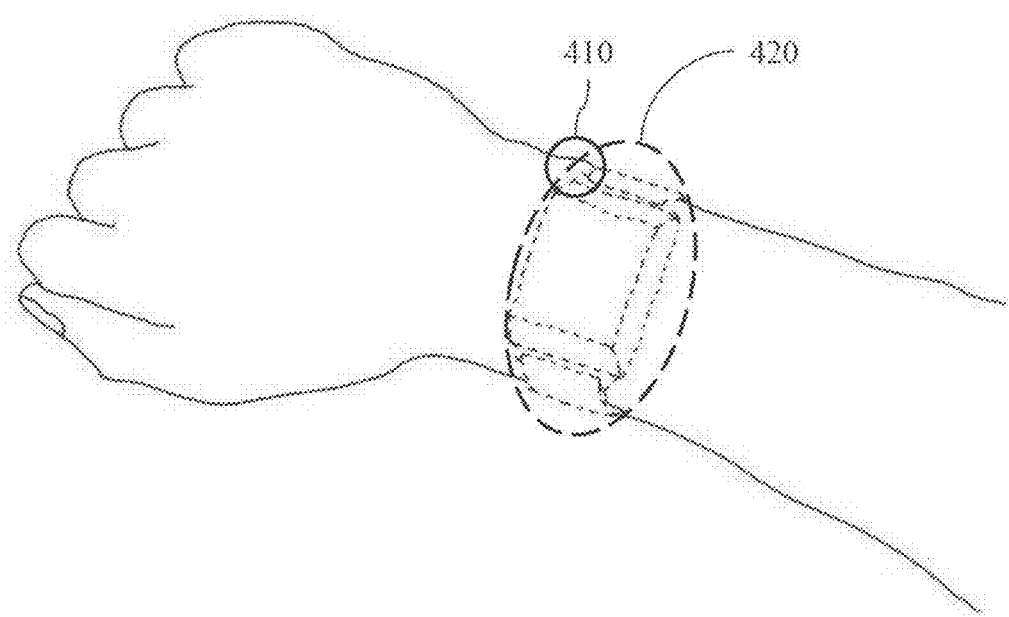
FIG. 2 is a schematic diagram of a wearing position of a wearable apparatus according to the present disclosure.

It should be noted that the wearable apparatus mentioned in the present disclosure is usually worn at a same position of the wrist as that at which a watch is worn, that is, the extensor bifurcation behind an ulna 410 of the arm. As shown in FIG. 2, since the extensor bifurcation at the rear of the ulna 410 has a flat contact surface, the wearable apparatus may be firmly attached to the muscle at the extensor bifurcation at the rear of the ulna 410. In this way, a user may easily fix the wearable apparatus onto the wrist without the need to look for a wearing position 420 at which the wearable apparatus may be fixed, and the wearable apparatus may be conveniently worn by the user.

The signal detecting module 110 is responsible for detecting a muscle active signal (the muscle active signal mentioned in the present disclosure includes a target muscle active signal and a training muscle active signal) from a wrist of a user. Generally, the signal detecting module 110 may continuously detect the muscle active signal during operation, but the present disclosure is not limited thereto.

In the present disclosure, the signal detecting module 110 generally uses a lower sampling frequency to detect the muscle active signal. For example, the signal detecting module 110 may use a sampling frequency of 200 Hz, but the present disclosure is not limited thereto. Since the signal detecting module 110 uses lower sampling frequency, the signal detecting module 110 also has lower power consumption, which may effectively reduce the power consumption of the wearable apparatus.

It should be particularly noted that, in the present disclosure, since the wearable apparatus may be stably worn on the wrist, the signal detecting module 110 disposed on the wearable apparatus may be in contact with skin at the extensor bifurcation behind the ulna. In this way, when the user makes a gesture, the signal detecting module 110 may stably detect a muscle active signal when flexors and extensors that control the wrist to flex and/or flexors and extensors that control the fingers are moving. Therefore, in the present disclosure, only one signal detecting module 110 is disposed on the wearable apparatus, that is, the muscle active signal may be effectively detected from the wrist, but in the present disclosure, there can be more than one signal detecting module 110 disposed on the wearable apparatus.

The signal filtering module 120 may filter out noise in the muscle active signal detected by the signal detecting module 110. The signal filtering module 120 may include a band-pass filter, and may use the band-pass filter to filter noise in the muscle active signal detected by the signal detecting module 110.

In some embodiments, if the signal filtering module 120 and the signal detecting module 110 are disposed in different apparatuses, the signal filtering module 120 may receive, in a wired or wireless manner, the muscle active signal detected by the signal detecting module 110, which is not particularly limited in the present disclosure.

The signal capturing module 130 is responsible for obtaining a muscle active signal. When the present disclosure includes the signal filtering module 120, the signal capturing module 130 may obtain the muscle active signal from the signal filtering module 120, and when the present disclosure does not include the signal filtering module 120, the signal capturing module 130 may obtain the muscle active signal from the signal detecting module 110.

The signal capturing module 130 is responsible for capturing a feature signal (the feature signal mentioned in the present disclosure includes a target feature signal and a training feature signal) including an amplitude that exceeds a predetermined value from the obtained muscle active signal. For example, the signal capturing module 130 may determine whether the amplitude of the muscle active signal on a predetermined axis exceeds a predetermined value, and when the amplitude of the muscle active signal on the predetermined axis exceeds the predetermined value, use the amplitude exceeding the predetermined value as a trigger point and capture a signal that is from a first time before the trigger point to a second time after the trigger point from the muscle active signal and use the signal as the feature signal. The foregoing predetermined axis is, for example, an X axis or a Y axis in a horizontal direction, or a Z axis in a vertical direction. The first time and the second time are time values, such as 0.2 seconds or 600 milliseconds. The predetermined axis, the first time, and the second time proposed in the present disclosure are not limited to the above.

The feature generating module 150 is responsible for generating feature data (the feature data mentioned in the present disclosure includes target feature data and training feature data) in accordance with the feature signal captured by the signal capturing module 130. More specifically, the feature generating module 150 may generate feature data according to a frequency, an amplitude, and time domain of the feature signal. For example, the feature generating module 150 may perform wavelet package decomposition (WPD) on the feature signal to generate a plurality of frequency ranges, and use one or more pieces of statistical data of a root mean square, a mean, a max value, a standard deviation, skewness, kurtosis, variance, zero crossing point, a crest factor, a form factor, a pulse factor, and an average rectified value on time-frequency domain signals in each frequency range to generate the feature data.

In some embodiments, the feature generating module 150 may include a high-pass filter, may first use the high-pass filter to filter the obtained feature signal, and then generate feature data in accordance with the filtered feature signal.

The feature generating module 150 may also normalize the feature signal first, so that a proportion of each feature signal captured from different gestures of a same user and same gestures of different users is the same, and then the feature data is generated in accordance with the normalized feature signal.

The gesture recognizing module 170 is responsible for classifying target feature data to recognize a user gesture. The gesture recognizing module 170 generally classifies, by using the gesture classification model, the target feature data generated by the feature generating module 150, and determines the user gesture in accordance with a classification result, but the present disclosure is not limited thereto.

Generally, the gesture recognizing module 170 may create a gesture classification model for classifying target feature data in accordance with the training feature data generated by the feature generating module 150. For example, the gesture recognizing module 170 may use classification algorithms of machine learning, such as K nearest neighbor (KNN), support vector machine (SVM), and linear discriminant analysis (LDA), and use the training feature data as training data to be input into the classification algorithms of machine learning, to generate a gesture classification model. However, the manner in which the gesture recognizing module 170 generates a gesture classification model is not limited to the above.

The feature screening module 180 may screen the training feature data generated by the feature generating module 150, and the gesture recognizing module 170 may create a gesture classification model in accordance with the training feature data screened by the feature screening module 180. In this way, the feature screening module 180 may screen out similar training feature data to avoid excessive non-approximate training feature data from affecting the recognition result, to further increase an overall calculation speed and reduce usage amount of hardware resources such as a memory when the gesture recognizing module 170 creates a gesture classification model. The feature screening module 180 may use a sequential forward selection (SFS) method for feature screening, but the present disclosure is not limited thereto.

Figure 3:
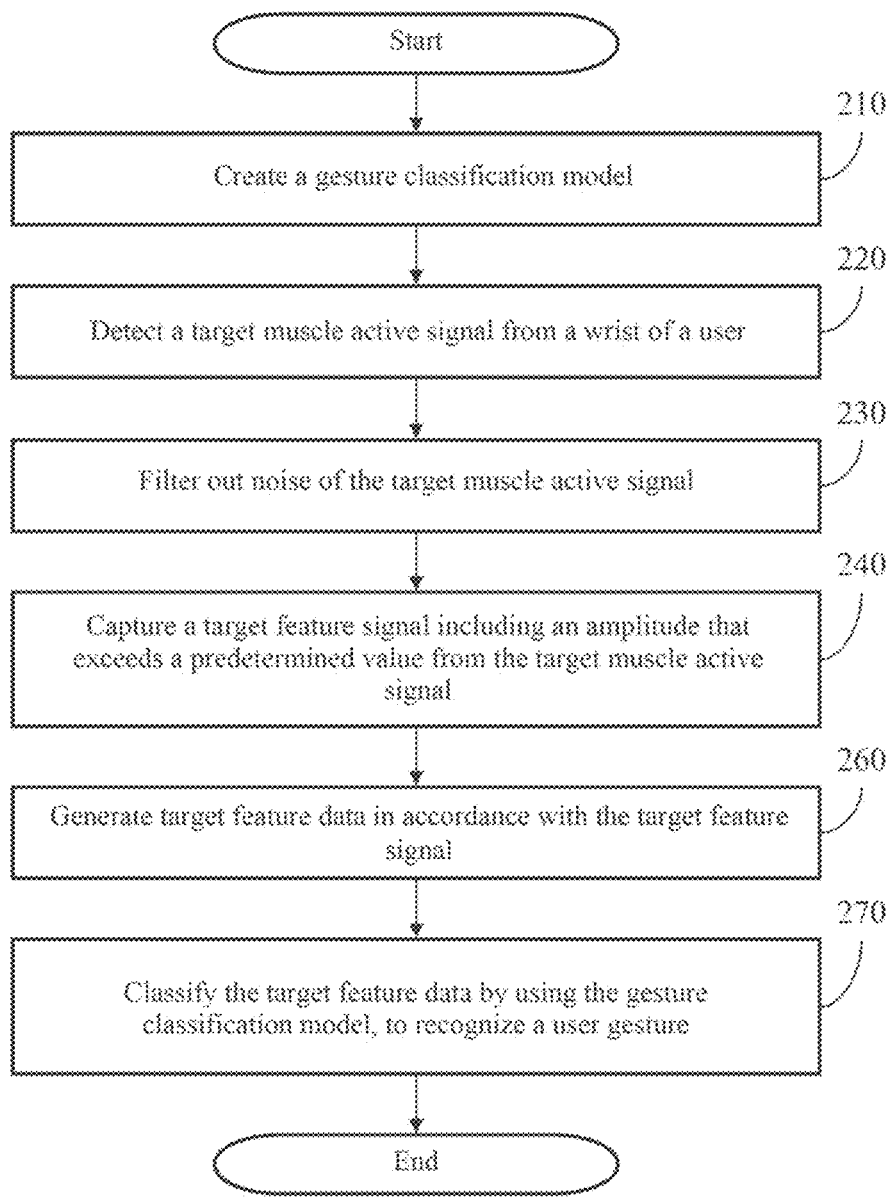
FIG. 3 is a flowchart of a method for recognizing user gestures according to a muscle active signal detected from a wrist according to the present disclosure.

Then a first embodiment is used to describe an operating system and a method of the present disclosure. Referring to FIG. 3, a flowchart of a method for recognizing user gestures according to a muscle active signal detected from a wrist according to the present disclosure is provided. In the present embodiment, it is assumed that all the modules of the present disclosure are disposed on a wearable apparatus, but the present disclosure is not limited thereto.

First, a gesture recognizing module 170 creates a gesture classification model (step 210). In the present embodiment, it is assumed that when the wearable apparatus is delivered out of the factory, a manufacturer of the wearable apparatus has written relevant data of the gesture classification model into the gesture recognizing module 170, to create a gesture classification model in the gesture recognizing module 170. The gesture classification model may recognize eight small gestures that will not make an arm move, such as clapping, flicking a forefinger, flicking a finger, throwing a coin, firing, palm up, palm down, and quick clenching.

After the user wears the wearable apparatus on the wrist and the wearable apparatus is activated, a signal detecting module 110 may start to detect a target muscle active signal from a wrist of the user (step 220). In the present embodiment, the wearable apparatus includes a fixed structure of the fixed signal detecting module 110. Through the fixed structure, the wearable apparatus may be stably worn behind an ulna at the wrist of the user, and the signal detecting module 110 may be surely in contact with skin of the wrist of the user, so that the signal detecting module 110 may continuously detect the target muscle active signal from muscles around the wrist of the user using a sampling frequency of 200 Hz.

Figure 4:
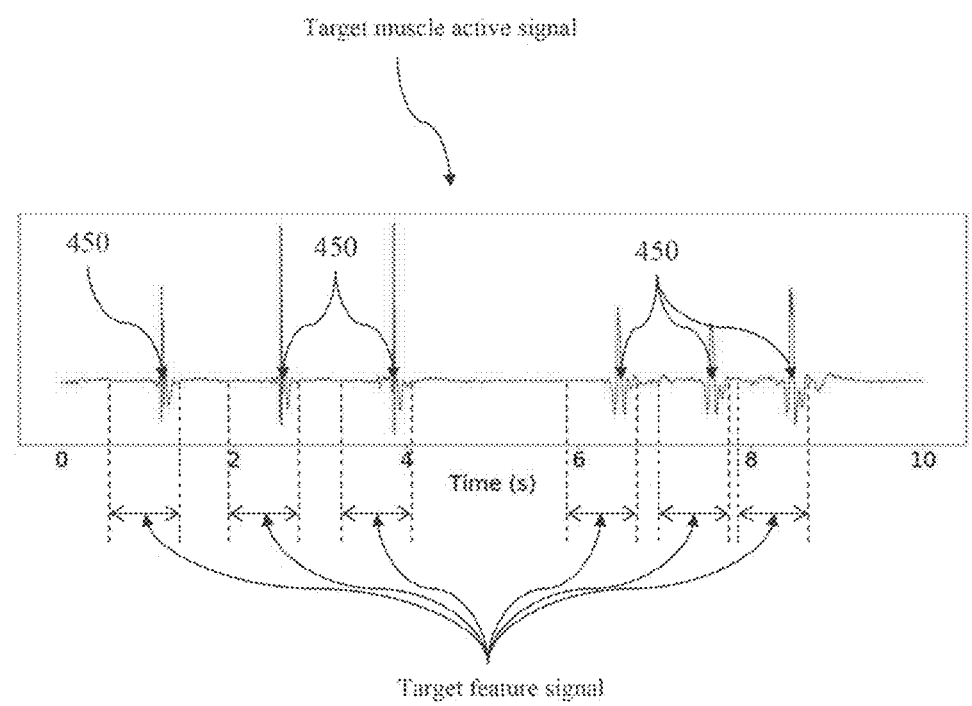
FIG. 4 is a schematic diagram of capturing a target feature signal according to an embodiment of the present disclosure.

After the signal detecting module 110 starts to detect the target muscle active signal, the signal capturing module 130 may capture a target feature signal including an amplitude that exceeds a predetermined value from the target muscle active signal detected by the signal detecting module 110 (step 240). In the present embodiment, it is assumed that the signal capturing module 130 determines whether an amplitude of the target muscle active signal on a Z axis exceeds a predetermined value. If the target muscle active signal on the Z axis is shown in FIG. 4, when determining that the amplitude of the target muscle active signal on the Z axis exceeds a predetermined value, the signal capturing module uses the amplitude exceeding the predetermined value as a trigger point 450, and captures a signal that is from 0.6 seconds before the trigger point (a first time) to 0.2 seconds after the trigger point (a second time) and from the target muscle active signal and uses the signal as the target feature signal.

If the wearable apparatus of the present embodiment includes a signal filtering module 120, after the signal detecting module 110 detects the target muscle active signal from a wrist of the user (step 220), the signal filtering module 120 may filter out noise in the target muscle active signal detected by the signal detecting module 110 (step 230). In the present embodiment, it is assumed that the signal filtering module 120 includes a band-pass filter of 5-50 Hz, and uses the included band-pass filter to filter out the noise in the target muscle active signal detected by the signal detecting module 110, so that the signal capturing module 130 may capture a target feature signal including an amplitude that exceeds a predetermined value from the target muscle active signal filtered by the signal filtering module 120 (step 240).

Figure 5:
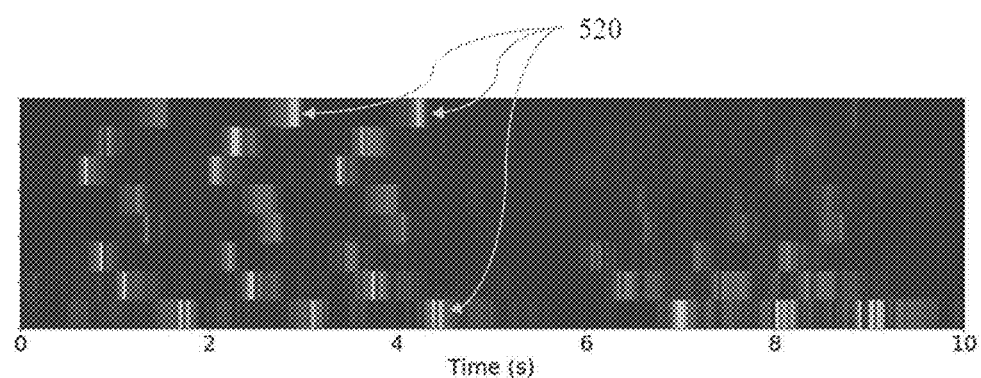
FIG. 5 is a diagram representing a frequency range generated by performing wavelet package decomposition according to an embodiment of the present disclosure.

After the signal capturing module 130 captures the target feature signal including the amplitude that exceeds the predetermined value from the target muscle active signal (step 240), the feature generating module 150 may generate target feature data in accordance with the target feature signal captured by the signal capturing module 130 (step 260). In the present embodiment, in order to prevent distorted resolution as a result of excessively low sampling frequency or excessively high decomposition order from indirectly affecting quality of the target feature data, the feature generating module 150 may perform third-order wavelet package decomposition on the target feature signal to generate a frequency range of eight layers, and generate target feature data in accordance with statistical data of a time-frequency domain signal 520 (as shown in FIG. 5) in a frequency range of each layer. The feature generating module 150 may also first use a high-pass filter of 1 Hz to filter the target feature signal captured by the signal capturing module 130, and/or may normalize the target feature signal captured by the signal capturing module 130, and then generate target feature data in accordance with the target feature signal.

After the feature generating module 150 generates the target feature data in accordance with the target feature signal (step 260), the gesture recognizing module 170 may classify, by using the gesture classification model, the target feature data generated by the feature generating module 150, to recognize the user gesture (step 270). In the present embodiment, it is assumed that the gesture classification model included in the gesture recognizing module 170 may be utilized by the gesture recognizing module 170 to calculate, in accordance with the target feature data, a probability of various gestures that can be determined by the gesture classification model, that is, calculating a probability of eight gestures such as clapping, flicking a forefinger, flicking a finger, throwing a coin, firing, palm up, palm down, and quick fist clenching. The gesture recognizing module 170 may determine a gesture with the highest calculated probability as the gesture made by the user. In this way, according to the present disclosure, a muscle active signal may be detected from the wrist of the user with low power consumption, and a gesture made by the user is recognized with excellent recognition ability.

Figure 6:
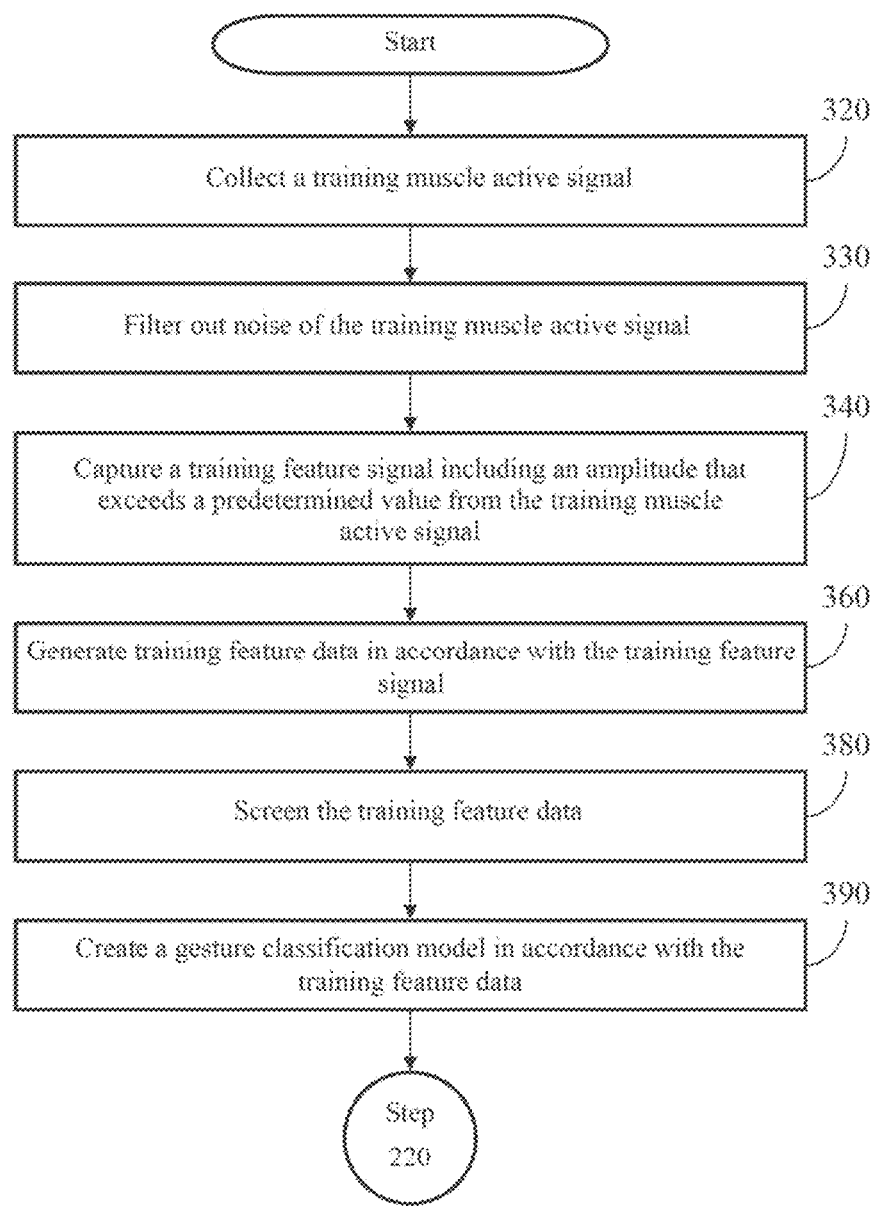
FIG. 6 is a flowchart of a method for creating a gesture classification model according to a muscle active signal according to the present disclosure.

In the foregoing embodiment, if the gesture recognizing module 170 does not include a gesture classification model when the wearable apparatus is delivered out of the factory, as shown in a process of FIG. 6, the signal detecting module 110 may collect a training muscle active signal (step 320). In the present embodiment, the signal detecting module 110 may detect a certain number of training muscle active signals from muscles around the wrist of the user, or be connected to a specific server to download training muscle active signals, or may receive a training muscle active signal uploaded by the user to collect the training muscle active signal.

After the signal detecting module 110 collects the training muscle active signal, the signal capturing module 130 may capture a training feature signal including an amplitude that exceeds a predetermined value respectively from the training muscle active signals collected by the signal detecting module 110 (step 340). In the present embodiment, it is assumed that the signal capturing module 130 uses a same method as the foregoing process of determining the user gesture in the present disclosure, that is, determining whether the amplitude of the training muscle active signal on the Z axis exceeds a predetermined value, and when the amplitude of the training muscle active signal on the Z axis exceeds the predetermined value, the amplitude exceeding the predetermined value is used as the trigger point, and the signal that is from 0.6 seconds before the trigger point (the first time) to 0.2 seconds after the trigger point (the second time) is captured from the training muscle active signal and is used as the training feature signal.

Similarly, if the wearable apparatus includes the signal filtering module 120, the signal filtering module 120 may filter out noise of the training muscle active signal collected by the signal detecting module 110 (step 330), so that the signal capturing module 130 may capture a training feature signal including an amplitude that exceeds a predetermined value from the training muscle active signal filtered by the signal filtering module 120 (step 340).

After the signal capturing module 130 captures a training feature signal including an amplitude that exceeds a predetermined value from the training muscle active signal (step 340), the feature generating module 150 may generate training feature data in accordance with the training feature signal captured by the signal capturing module 130 (step 350). In the present embodiment, the same as the foregoing method for recognizing user gestures, the feature generating module 150 may perform third-order wavelet package decomposition on the training feature signal to generate the frequency range of eight layers, and generate target feature data in accordance with the statistical data of the time-frequency domain signal in the frequency range of each layer. The feature generating module 150 may also first use a high-pass filter of 1 Hz to filter the training feature signal captured by the signal capturing module 130, and/or may normalize the training feature signal captured by the signal capturing module 130, and then generate training feature data in accordance with the training feature signal.

After the feature generating module 150 generates training feature data in accordance with the training feature signal (step 360), the gesture recognizing module 170 may create a gesture classification model in accordance with the training feature data generated by the feature generating module 150 (step 390). In the present embodiment, it is assumed that the gesture recognizing module 170 may use the K nearest neighbor algorithm as a classification algorithm of machine learning, and input training feature data as training data to the K nearest neighbor algorithm to generate a gesture classification model.

In the present embodiment, if the wearable apparatus further includes a feature screening module 180, the feature screening module 180 may first screen the training feature data generated by the feature generating module 150 (step 380) after the feature generating module 150 generates training feature data in accordance with the training feature signal (step 360), and then the gesture recognizing module 170 creates a gesture classification model in accordance with the training feature data generated by the feature generating module 150 (step 390).

Then a second embodiment is used to describe the operating system and method of the present disclosure, still referring to FIG. 3. In the present embodiment, it is assumed that only the signal detecting module 110 is disposed on the wearable apparatus. The wearable apparatus is connected to a computing apparatus through wired or wireless communication. Other modules other than the signal detecting module 110 of the present disclosure are disposed in the computing apparatus, but the present disclosure is not limited thereto.

First, the computing apparatus may collect a training muscle active signal. In the present embodiment, it is assumed that the computing apparatus may detect a certain number of training muscle active signals from muscles around the wrist of the user through the signal detecting module 110 in the wearable apparatus, or may be connected to a specific server through a communication module of the computing apparatus to download training muscle active signals, or may receive, through an input module of the computing apparatus, the training muscle active signal uploaded by the user, to collect the training muscle active signal.

Afterwards, the signal capturing module 130 of the computing apparatus may capture a training feature signal including an amplitude that exceeds a predetermined value from the collected training muscle active signal (step 340). In the present embodiment, it is assumed that the signal capturing module 130 may also determine whether the amplitude of the training muscle active signal on the Z axis exceeds a predetermined value, and when the amplitude of the training muscle active signal on the Z axis exceeds the predetermined value, the amplitude exceeding the predetermined value is used as the trigger point, and the training feature signal is captured from the training muscle active signal.

If the computing apparatus includes a signal filtering module 120, the signal filtering module 120 may filter out the noise of the collected training muscle active signal (step 330), so that the signal capturing module 130 of the computing apparatus may capture a training feature signal including an amplitude that exceeds a predetermined value from the training muscle active signal filtered by the signal filtering module 120 (step 340).

After the signal capturing module 130 of the computing apparatus captures a training feature signal including an amplitude that exceeds a predetermined value from the training muscle active signal (step 340), the feature generating module 150 of the computing apparatus may generate training feature data in accordance with the training feature signal captured by the signal capturing module 130 (step 350). In the present embodiment, it is assumed that the feature generating module 150 may perform third-order wavelet package decomposition on the training feature signal to generate the frequency range of eight layers, and generate target feature data in accordance with the statistical data of the time-frequency domain signal in the frequency range of each layer. The feature generating module 150 may also first use a high-pass filter of 1 Hz to filter the training feature signal captured by the signal capturing module 130, and/or may normalize the training feature signal captured by the signal capturing module 130, and then generate training feature data in accordance with the training feature signal.

After the feature generating module 150 of the computing apparatus generates training feature data in accordance with the training feature signal (step 360), the gesture recognizing module 170 of the computing apparatus may create a gesture classification model in accordance with the training feature data generated by the feature generating module 150 (step 390).

In the present embodiment, if the computing apparatus further includes a feature screening module 180, the feature screening module 180 may first screen the training feature data generated by the feature generating module 150 (step 380) after the feature generating module 150 of the computing apparatus generates training feature data in accordance with the training feature signal (step 360), and then the gesture recognizing module 170 of the computing apparatus creates a gesture classification model in accordance with the training feature data generated by the feature generating module 150 (step 390).

After the feature screening module 180 of the computing apparatus creates the gesture classification model, the signal detecting module 110 of the wearable apparatus may start to detect the target muscle active signal from a wrist of the user (step 220), and may transmit the detected target muscle active signal to the computing apparatus through wired or wireless communication.

After receiving the target muscle active signal transmitted by the signal detecting module 110 of the wearable apparatus, the signal capturing module 130 of the computing apparatus may capture a target feature signal including an amplitude that exceeds a predetermined value from the received target muscle active signal (step 240). In the present embodiment, it is assumed that the signal capturing module 130 may determine whether the amplitude of the target muscle active signal on the Z axis exceeds a predetermined value, and when it is determined that the amplitude of the target muscle active signal on the Z axis exceeds the predetermined value, the amplitude exceeding the predetermined value is used as the trigger point 450, and the target feature signal is captured from the target muscle active signal.

Similarly, if the computing apparatus of the present embodiment includes a signal filtering module 120, the signal filtering module 120 may first filter out noise of the target muscle active signal transmitted by the signal detecting module 110 (step 230), and the signal capturing module 130 of the computing apparatus then captures a target feature signal including an amplitude that exceeds a predetermined value from the filtered target muscle active signal (step 240).

After the signal capturing module 130 of the computing apparatus captures a target feature signal including an amplitude that exceeds a predetermined value from the target muscle active signal (step 240), the feature generating module 150 of the computing apparatus may generate target feature data in accordance with the target feature signal captured by the signal capturing module 130 (step 260). In the present embodiment, the feature generating module 150 may perform third-order wavelet package decomposition on the target feature signal to generate the frequency range of eight layers, and generate target feature data in accordance with the statistical data of the time-frequency domain signal in the frequency range of each layer. The feature generating module 150 may also first use a high-pass filter to filter the target feature signal captured by the signal capturing module 130, and/or may normalize the target feature signal captured by the signal capturing module 130, and then generate target feature data in accordance with the target feature signal.

After the feature generating module 150 of the computing apparatus generates the target feature data in accordance with the target feature signal (step 260), the gesture recognizing module 170 of the computing apparatus may classify, by using the gesture classification model, the target feature data generated by the feature generating module 150, to recognize the user gesture (step 270). In this way, according to the present disclosure, a muscle active signal may be detected from the wrist of the user with low power consumption, and a gesture made by the user is recognized with excellent recognition ability.

Based on the above, it may be learned that a difference between the present disclosure and the prior art is that, after the target muscle active signal is detected from the wrist of the user through the wearable apparatus, the target feature signal including the amplitude that exceeds the predetermined value is captured from the target muscle active signal, the target feature data is generated in accordance with the captured target feature signal, and the target feature data is classified by using the gesture classification model, to recognize the user gesture. With the technical means, the problems of low accuracy of using an electromyography signal to determine the gesture and the difficulty in wearing the sensor at the correct position using the muscle active signal in the prior art can be resolved. User gestures can be recognized with lower power consumption. Product costs are also reduced.

Furthermore, the method for recognizing user gestures according to the muscle active signal detected from the wrist according to the present disclosure may be implemented in hardware, software or a combination of hardware and software, and may also be implemented in a centralized manner in a computer system or in a decentralized manner in which different elements are distributed in several interconnected computer systems.

Although the present disclosure is described with reference to the above embodiments, the embodiments are not intended to limit the present disclosure. A person of ordinary skill in the art may make variations and modifications without departing from the spirit and scope of the present disclosure. Therefore, the protection scope of the present disclosure should be subject to the appended claims.

DESCRIPTION OF SYMBOLS

110 Signal detecting module
120 Signal filtering module
130 Signal capturing module
150 Feature generating module
170 Gesture recognizing module
180 Feature screening module
410 Ulna
420 Wearing position
450 Trigger point
520 Time-frequency domain signal
Step 210: Create a gesture classification model
Step 220: Detect a target muscle active signal from a wrist of a user
Step 230: Filter out noise in the target muscle active signal
Step 240: Capture a target feature signal including an amplitude that exceeds a predetermined value from the target muscle active signal
Step 260: Generate target feature data in accordance with the target feature signal
Step 270: Classify the target feature data by using the gesture classification model, to recognize a user gesture
Step 320: Collect a training muscle active signal
Step 330: Filter out noise in the training muscle active signal
Step 340: Capture a training feature signal including an amplitude that exceeds a predetermined value from the training muscle active signal
Step 360: Generate training feature data in accordance with the training feature signal
Step 380: Screen the training feature data
Step 390: Create a gesture classification model in accordance with the training feature data

What is claimed is:

1. A method for recognizing user gestures according to a muscle active signal detected from a wrist, comprising:
creating a gesture classification model;
detecting a target muscle active signal from a wrist of a user;
when it is determined that an amplitude of the target muscle active signal on a predetermined axis exceeds a predetermined value, using the amplitude exceeding the predetermined value as a trigger point, capturing, from the target muscle active signal, a signal from a first time before the trigger point to a second time after the trigger point, and using the signal as a target feature signal;
generating target feature data in accordance with the target feature signal; and
classifying the target feature data by using the gesture classification model so as to recognize a user gesture.

2. The method for recognizing user gestures according to the muscle active signal detected from the wrist according to claim 1, wherein the step of generating target feature data in accordance with the target feature signal comprises performing wavelet package decomposition (WPD) on the target feature signal to generate a plurality of frequency ranges, and generating the target feature data using time-frequency domain signals in each frequency range.

3. The method for recognizing user gestures according to the muscle active signal detected from the wrist according to claim 1, further comprising filtering out noise in the target muscle active signal prior to the step of determining that the amplitude of the target muscle active signal on the predetermined axis exceeds the predetermined value.

4. The method for recognizing user gestures according to the muscle active signal detected from the wrist according to claim 1, wherein the step of creating the gesture classification model comprises:
collecting a plurality of training muscle active signals;
capturing, from the training muscle active signals, a plurality of training feature signals comprising an amplitude that exceeds a predetermined value;
converting the training feature signals into training feature data; and
creating the gesture classification model in accordance with the training feature data.

5. The method for recognizing user gestures according to the muscle active signal detected from the wrist according to claim 4, wherein the step of creating the gesture classification model in accordance with the training feature data further comprises the step of screening the training feature data.

6. A system for recognizing user gestures according to a muscle active signal detected from a wrist, comprising:
a signal detecting module configured to detect a target muscle active signal from a wrist of a user;
a signal capturing module electrically connected to the signal detecting module and, when it is determined that an amplitude of the target muscle active signal on a predetermined axis exceeds a predetermined value, configured to use the amplitude exceeding the predetermined value as a trigger point and capture a signal from a first time before the trigger point to a second time after the trigger point from the target muscle active signal, and use the signal as the target feature signal;
a feature generating module electrically connected to the signal capturing module and configured to generate target feature data in accordance with the target feature signal; and
a gesture recognizing module electrically connected to the feature generating module and configured to classify the target feature data to recognize the user gestures.

7. The system for recognizing user gestures according to the muscle active signal detected from the wrist according to claim 6, wherein the feature generating module performs wavelet package decomposition on the target feature signal to generate a plurality of frequency ranges, and generates the target feature data using time-frequency domain signals in each frequency range.

8. The system for recognizing user gestures according to the muscle active signal detected from the wrist according to claim 6, further comprising a signal filtering module electrically connected to the signal detecting module and configured to filter out noise in the target muscle active signal.

9. The system for recognizing user gestures according to the muscle active signal detected from the wrist according to claim 6, wherein:
the signal detecting module is further configured to collect a plurality of training muscle active signals;
the signal capturing module is further configured to capture a plurality of training feature signals comprising an amplitude that exceeds a predetermined value from the training muscle active signals;
the feature generating module is further configured to convert the training feature signals into training feature data; and the gesture recognizing module is further configured to create a gesture classification model in accordance with the training feature data, to classify the target feature data by using the gesture classification model.

10. The system for recognizing user gestures according to the muscle active signal detected from the wrist according to claim 9, further comprising a feature screening module electrically connected to the gesture recognizing module and configured to screen the training feature data, so that the gesture recognizing module creates the gesture classification model in accordance with the screened training feature data.

* * * * *